(12) United States Patent
Proctor et al.

(10) Patent No.: US 8,286,173 B2
(45) Date of Patent: Oct. 9, 2012

(54) METHODS AND APPARATUS FOR WINDOW-BASED FAIR PRIORITY SCHEDULING

(75) Inventors: Seth T. Proctor, Concord, MA (US); David A. Jurgens, Los Angeles, CA (US); David R. Chase, Belmont, MA (US)

(73) Assignee: Oracle America, Inc., Redwood City, CA (US)

( * ) Notice: Subject to any disclaimer, the term of this patent is extended or adjusted under 35 U.S.C. 154(b) by 1265 days.

(21) Appl. No.: 11/726,830

(22) Filed: Mar. 23, 2007

(65) Prior Publication Data

US 2008/0235693 A1    Sep. 25, 2008

(51) Int. Cl.
*G06F 9/46* (2006.01)
(52) U.S. Cl. .................... 718/103; 718/100; 718/102
(58) Field of Classification Search .................. 718/100, 718/102, 103
See application file for complete search history.

(56) References Cited

U.S. PATENT DOCUMENTS

| | | | |
|---|---|---|---|
| 6,438,704 B1* | 8/2002 | Harris et al. | 713/502 |
| 6,804,249 B1* | 10/2004 | Bass et al. | 370/412 |
| 6,986,137 B1* | 1/2006 | King et al. | 718/104 |
| 7,007,276 B1* | 2/2006 | Kubala et al. | 718/104 |
| 7,093,250 B1* | 8/2006 | Rector | 718/100 |
| 7,159,221 B1* | 1/2007 | Willen et al. | 718/104 |
| 7,461,380 B2* | 12/2008 | Nishimura | 719/314 |
| 7,509,671 B1* | 3/2009 | Bedell et al. | 726/6 |
| 7,548,335 B2* | 6/2009 | Lawrence et al. | 358/1.15 |
| 7,689,998 B1* | 3/2010 | Chrysanthakopoulos | 718/104 |
| 2003/0172104 A1* | 9/2003 | Hooman et al. | 709/103 |
| 2004/0015973 A1* | 1/2004 | Skovira | 718/103 |
| 2004/0054999 A1* | 3/2004 | Willen et al. | 718/103 |
| 2004/0064817 A1* | 4/2004 | Shibayama et al. | 718/104 |
| 2004/0117790 A1* | 6/2004 | Rhine | 718/100 |
| 2005/0021712 A1* | 1/2005 | Chassapis et al. | 709/223 |
| 2005/0289394 A1* | 12/2005 | Arrouye et al. | 714/15 |

OTHER PUBLICATIONS

Kwok et al, "Static Scheduling Algorithms for Allocating Directed Task Graphs to Multiprocessors", ACM Computing Surveys, vol. 31, No. 4, Dec. 1999, pp. 1-66.*
Liu et al, "On Means to provide Flexiblity in Scheduling", 1988, ACM, pp. 32-34.*

* cited by examiner

*Primary Examiner* — Emerson Puente
*Assistant Examiner* — Charles Swift
(74) *Attorney, Agent, or Firm* — Brooks Kushman P.C.

(57) ABSTRACT

A system provides a task scheduler to define a priority queue with at least one window and a queue-window key. Each window is an ordered collection of tasks in a task pool of the priority queue and is identified by the queue-window key. The task scheduler sets a task-window key equal to a user-window key when the user-window key is greater than the minimum queue-window key. The task scheduler can further set the task-window key equal to the minimum queue-window key when the user-window key is less than the minimum queue-window key. A maximum task limit per user for each window and a priority increment for the user-window key are further applied to ensure fair scheduling.

12 Claims, 8 Drawing Sheets

207 COMPARE THE USER-WINDOW KEY TO A MINIMUM QUEUE-WINDOW KEY TO QUEUE THE TASK.

209 SET THE TASK-WINDOW KEY OF THE TASK AS EQUAL TO THE USER-WINDOW KEY WHEN: THE USER-WINDOW KEY DESCRIBES A WINDOW THAT DOES NOT SATISFY THE MAXIMUM TASK LIMIT FOR THE USER AND THE USER-WINDOW KEY IS GREATER THAN THE MINIMUM QUEUE-WINDOW KEY AND FURTHER SETTING THE USER-WINDOW KEY TO AN AGGREGATE OF THE USER-WINDOW KEY AND THE PRIORITY INCREMENT.

210 SET THE TASK-WINDOW KEY OF THE TASK AS EQUAL TO THE AVAILABLE WINDOW KEY WHEN: THE USER-WINDOW KEY DESCRIBES A WINDOW THAT SATISFIES THE MAXIMUM TASK LIMIT FOR THE USER AND THE USER-WINDOW KEY IS GREATER THAN THE MINIMUM QUEUE-WINDOW KEY AND FURTHER SETTING THE USER-WINDOW KEY TO AN AGGREGATE OF THE AVAILABLE WINDOW KEY AND THE PRIORITY INCREMENT.

FIG. 5

207 COMPARE THE USER-WINDOW KEY TO A MINIMUM QUEUE-WINDOW KEY TO QUEUE THE TASK.

211 SET THE TASK-WINDOW KEY OF THE TASK AS EQUAL TO THE MINIMUM QUEUE-WINDOW KEY WHEN: THE USER-WINDOW KEY IS LESS THAN THE MINIMUM QUEUE-WINDOW KEY AND FURTHER SETTING THE USER-WINDOW KEY TO AN AGGREGATE OF THE MINIMUM QUEUE-WINDOW KEY AND THE PRIORITY INCREMENT.

FIG. 6

METHODS AND APPARATUS FOR WINDOW-BASED FAIR PRIORITY SCHEDULING

BACKGROUND

Conventional scheduling and routing systems employ Weighted Fair Queuing (WFQ) and Generalized Processor Sharing (GPS). These conventional techniques are typically used in packet routing systems, and assume there is some notion of fixed work per packet and therefore a quantifiable measure of rounds and work needed per round. Other conventional systems can involve simple FIFO-based structures that use a Round-Robin scheduler across multiple FIFO queues (1 for each user).

Weighted Fair Queuing (WFQ) can be seen as a combination of priority queuing and fair queuing involving multiple queues. In WFQ, all queues are serviced so that none are starved, but some queues are serviced more than others. A weight is applied to the queues to give some queues a higher priority. For example, one queue may get half the available bandwidth and other queues will get an allocation of the remaining bandwidth. Traffic may be prioritized according to packet markings, source and destination IP address fields, and port numbers. WFQ weights traffic so that low-bandwidth traffic gets a fair level of priority. If high-priority queues are not in use, then lower-priority traffic uses its queues.

Such conventional systems suffer from the shortcoming of not providing fairness for the scheduling of tasks submitted from a large number of simultaneous users, where such tasks cannot be divided up into smaller tasks or time-shifted. Also, iterating over multiple queues, which is required to manage all users, adds a burdensome layer of complication as to managing keys to compute priority metrics.

SUMMARY

Embodiments disclosed herein provide for the fair scheduling of tasks in a single window-based priority queue via a task scheduler. Such subsequent embodiments described herein overcome the above-described shortcomings by introducing a minimum of latency and requiring only a single priority queue to handle an arbitrary number of users and to manage task priority types. The task scheduler described herein allows for fair scheduling for any number of users through the use of a single priority queue. Such an approach embodied by the task scheduler can be expressed by the following phrase: "No one gets seconds until everyone has had firsts who wants them."

The task scheduler uses a non-traditional implementation of a queue. Specifically, the task scheduler defines a single priority queue as a task pool to hold tasks awaiting execution. A window is defined as an ordered collection of tasks in the task pool of the single priority queue, each task in the window having the same task-window key value. Each task is associated with a user and has a timestamp and a task-window key. Further, at least one user-window key for the user is defined. A maximum task limit per user at each window and a priority increment for the user-window key are further applied to ensure the fair scheduling.

Upon submission of a task to the priority queue, the task scheduler sets the task-window key of the task as equal to the user-window key when the user-window key describes a window that does not satisfy the maximum task limit for the user and the user-window key is greater than the minimum queue-window key and further sets the user-window key to an aggregate of the user-window key and a priority increment.

Also, the task scheduler can set the task-window key of the task as equal to an available window key when the user-window key describes a window that satisfies the maximum task limit for the user and the user-window key is greater than the minimum queue-window key and further setting the user-window key to an aggregate of the available window key and the priority increment.

The task scheduler can set the task-window key of the task as equal to the minimum queue-window key when the user-window key is less than the minimum queue-window key and further setting the user-window key to an aggregate of the minimum queue-window key and the priority increment. Such fair scheduling in accordance with the invention can also include the use of weighted priorities to further give each user the same chance to run tasks.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Sun Microsystems, Inc. of Santa Clara, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 5 is a flow chart of detailed processing steps that show high-level processing operations performed by a task scheduler to compare the user-window key to a minimum queue-window key to queue the task.

FIG. 6 is a flow chart of processing steps that show high-level processing operations performed by a task scheduler to compare the user-window key to a minimum queue-window key to queue the task.

DETAILED DESCRIPTION

Figure 1:
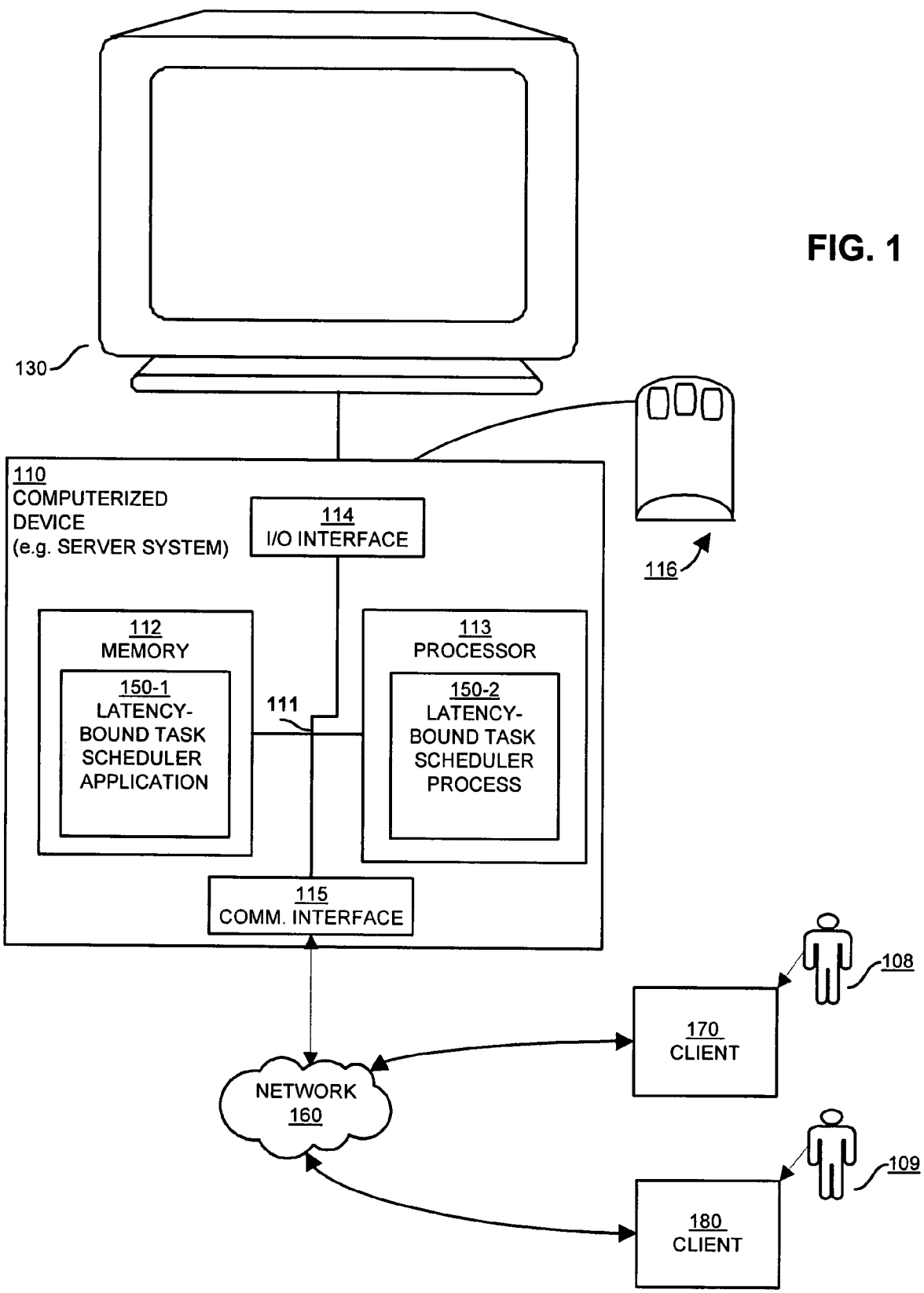
FIG. 1 shows a high level view according to one embodiment disclosed herein.

Embodiments disclosed herein provide a task scheduler for the fair scheduling of tasks in a single window-based priority queue. The task scheduler defines a priority queue with at least one window and a queue-window key. Each window is an ordered collection of tasks in a task pool of the priority queue and is identified by the queue-window key. The task scheduler sets a task-window key equal to a user-window key when the user-window key is greater than the minimum queue-window key. The task scheduler can further set the task-window key equal to the minimum queue-window key when the user-window key is less than the minimum queue-window key. A maximum task limit per user for each window and a priority increment for the user-window key are further applied to ensure fair scheduling. The task scheduler introduces a minimum of latency, and requires only a single priority queue to handle an arbitrary number of users and to also manage task priority types.

Tasks received by the task scheduler can be latency-bound tasks that require processing and execution as soon as possible after being submitted. Such discrete, short-lived tasks can run in the context of applications and on behalf of a specific user of that application. The task scheduler can handle any number of users (often in the thousands) submitting latency-bound tasks for a single application, such as a high-performance online video game that is being accessed by thousands of simultaneous remote users. Hence, the task scheduler for that application needs to maintain fairness between these users while balancing the requirement that latency-bound tasks execute with a minimum of latency.

The task scheduler can minimize the work required to do fair scheduling across any number of users who are submitting short-lived tasks. A non-traditional implementation of a queue can be used to define the single priority queue of the task scheduler. In one embodiment, the priority queue can be a pool of submitted tasks awaiting extraction from the queue for execution according to priority. In the alternative, however, the priority queue can be backed by an array or binary heap, and sorts items in the queue based on priority. Further, the priority queue can have a queue-window key (e.g., a window value) for each window. The queue-window key can have values numbered in an increasing order. Furthermore, the minimum queue-window key can represent the window with the lowest window number value in the queue (the window described by the minimum queue-window key) and therefore the highest priority.

The task scheduler interacts with a subset of tasks in the task pool of the single priority queue, called a window. A window can be an actual structure, such as an allocated memory location, or the window can be a notional structure. When implemented as a notional structure, the window can include all tasks in the priority queue that share the same task-window key. Thus, for example, window '4' in the priority queue is made up of only those submitted tasks that have a task-window key set to '4.' Further, each window can limit every user to a maximum number of tasks in the window. For example, when the maximum task limit is one task per user for each window, then the next task scheduled by a user must be in the next available window: at least window N+1 if that user last scheduled a task in window N. However, a window can also be defined to contain multiple tasks per user but limit the number of tasks according to task priority type. For instance, a maximum task limit can be defined to allow a user a total of three tasks per window, such as one of each task with a priority type high, medium, and low.

The priority for tasks in the priority queue of the task scheduler can be determined by two fields: the task timestamp, and the user-window key. Each user-window key can start at 0. There can be multiple user-window keys for each user that can be used differing task types.

When a task is submitted to the priority queue on behalf of a given user, that submitted task can include a task-window key and a timestamp describing the time at which the task was submitted to run (or the time the task was submitted to the priority queue). All submitted tasks can be prioritized first by window, and then by timestamp, where the lower the window number the higher the priority (and similarly for timestamps).

When a user submits a task, the priority queue of the task scheduler returns the window value in which the task was actually queued. The user-window key can be set to this returned value, with or without the calculation of a priority increment. In particular, if the user-window key associated with the submitted task is higher than (or equal to) the current value of the queue-window key (the minimum queue-window key), then the task scheduler will queue the task at a window equal to the user-window key and then returns the value of that window in which the submitted task was queued. If the user-window key associated with the submitted task is lower than the current value of the minimum queue-window key, then the task scheduler returns the value of the minimum queue-window key as the window in which the submitted task was queued.

Thus, the task scheduler can ensure that users that lag behind always can catch up by being assigned a high priority for an initial task, but don't sustain such a high priority assignment thereafter.

Specifically, the task scheduler defines a window as an ordered collection of tasks, each task in the window having the same task-window key. Each task is defined with a timestamp and a task-window key, and each task is associated with a user. The task scheduler defines a single priority queue as a task pool to hold tasks awaiting execution and defines at least one user-window key for the user.

Further, upon submission of a task to the priority queue, the task scheduler sets the task-window key of the task as equal to the user-window key when the user-window key describes a window that does not satisfy the maximum task limit for the user and the user-window key is greater than the minimum queue-window key and further sets the user-window key to an aggregate of the user-window key and a priority increment. Also, the task scheduler can set the task-window key of the task as equal to an available window key when the user-window key describes a window that satisfies the maximum task limit for the user and the user-window key is greater than the minimum queue-window key and further setting the user-window key to an aggregate of the available window key and the priority increment.

Another condition has the task scheduler setting the task-window key of the task as equal to the minimum queue-window key when the user-window key is less than the minimum queue-window key and further setting the user-window key to an aggregate of the minimum queue-window key and the priority increment.

For the task scheduler to further support priorities, the task scheduler gives each user multiple user-window keys, where a user can have a user-window key for each type of task priority used and the task scheduler can set a unique priority increment for a user-window key associated with the task priority type. For instance, low priority windows might increase a low priority user-window key with a priority increment of 6 with each submitted low priority task. A medium priority user-window key can have an increment of 2, and a high priority user-window key can be incremented by 1. Where all user-window keys for each priority type start at zero, this means that the first window in the queue (the window described by the minimum queue-window key) can have tasks of all three priorities per user. A second window can only have high-priority tasks, a third window can have both high and medium-priority tasks, etc. It is to be understood that such a priority policy is easy to modify and enhance for any given application. Thus, priority can be expressed as part of the task via a task type, so that the correct minimum window for that priority can be returned by the priority queue if the user has fallen behind.

Note that additional keys or fields can be added to the definitions of the task, priority queue and window based on other aspects of the task scheduler to further define ordering if window and timestamp are equal and for other conditions. For instance, a task scheduler might use past performance, total tasks run through the queue, etc. It is also be possible to invert the timestamp ordering for each window, or perform some similar operation, so that users who jump into the priority queue first are not always served first. A person having ordinary skill in the art can understand that all tasks can carry the same cost, but if certain tasks take noticeably longer times the task scheduler can compensate for this via a weight field and by varying the priority increment function for user-window keys associated with those tasks. Additionally, it is understood that the term "key" can be interpreted as a piece of information, an attribute, or a field.

It is understood for the purposes of this document that when a user submits a task, the user can be interacting with a client system that can communicate with a server system implementing the task scheduler. Thus, the submitted task is submitted via the user operating the client system. However, task submission and the task scheduler can occur locally within a computer system and does not require the use of a network.

FIG. 1 is a block diagram illustrating example architecture of a computer system 110 that executes, runs, interprets, operates or otherwise performs a task scheduler application 150-1 and a task scheduler process 150-2 configured in accordance with embodiments of the invention. The computer system 110 may be any type of computerized device such as a personal computer, workstation, portable computing device, console, laptop, network terminal or the like. Specifically, the computer system 110 can be a server system that can receive latency-tasks from a large number of simultaneous users. As shown in this example, the computer system 110 includes an interconnection mechanism 111 such as a data bus, motherboard or other circuitry that couples a memory system 112, a processor 113, an input/output interface 114, and a communications interface 115. The communications interface 115 can interact with a network 160 to receive tasks submitted by a plurality of users 108, 109, where each user can be at a client 170, 180. It is understood that the invention can receive tasks from thousands of simultaneous users, or from a single user, for example.

In addition, an input device 116 (e.g., one or more user/developer controlled devices such as a keyboard, mouse, touch pad, etc.) couples to the computer system 110 and processor 113 through an input/output (I/O) interface 114 runs a software program (such as an Internet computer game) that receives and scheduled tasks provided via task scheduler application 150-1 and process 150-2. Since the computer system 110 can act as a server, it can receive many tasks from many remote users involved in an Internet game. Thus, the computer system 110 can host an Internet gaming service and thereby implementing the task scheduler application 150-1 and process 150-2 to provide fair scheduling of tasks submitted by all the remote users.

The memory system 112 is any type of computer readable medium and in this example of FIG. 1 is encoded with a task scheduler application 150-1 that provides fair scheduling of tasks in a single window-based priority queue for an event-driven system. The task scheduler application 150-1 may be embodied as software code such as data and/or logic instructions (e.g., code stored in the memory or on another computer readable medium such as a removable disk) that supports processing functionality according to different embodiments described herein. During operation of the computer system 110 (e.g. a server system to receive tasks), the processor 113 accesses the memory system 112 via the interconnect 111 in order to launch, run, execute, interpret or otherwise perform the logic instructions of the task scheduler application 150-1. Execution of the task scheduler application 150-1 in this manner produces processing functionality in a task scheduler process 150-2. In other words, the process 150-2 represents one or more portions or runtime instances of the application 150-1 (or the entire application 150-1) performing or executing within or upon the processor 113 in the computerized device 110 at runtime.

Figure 8:
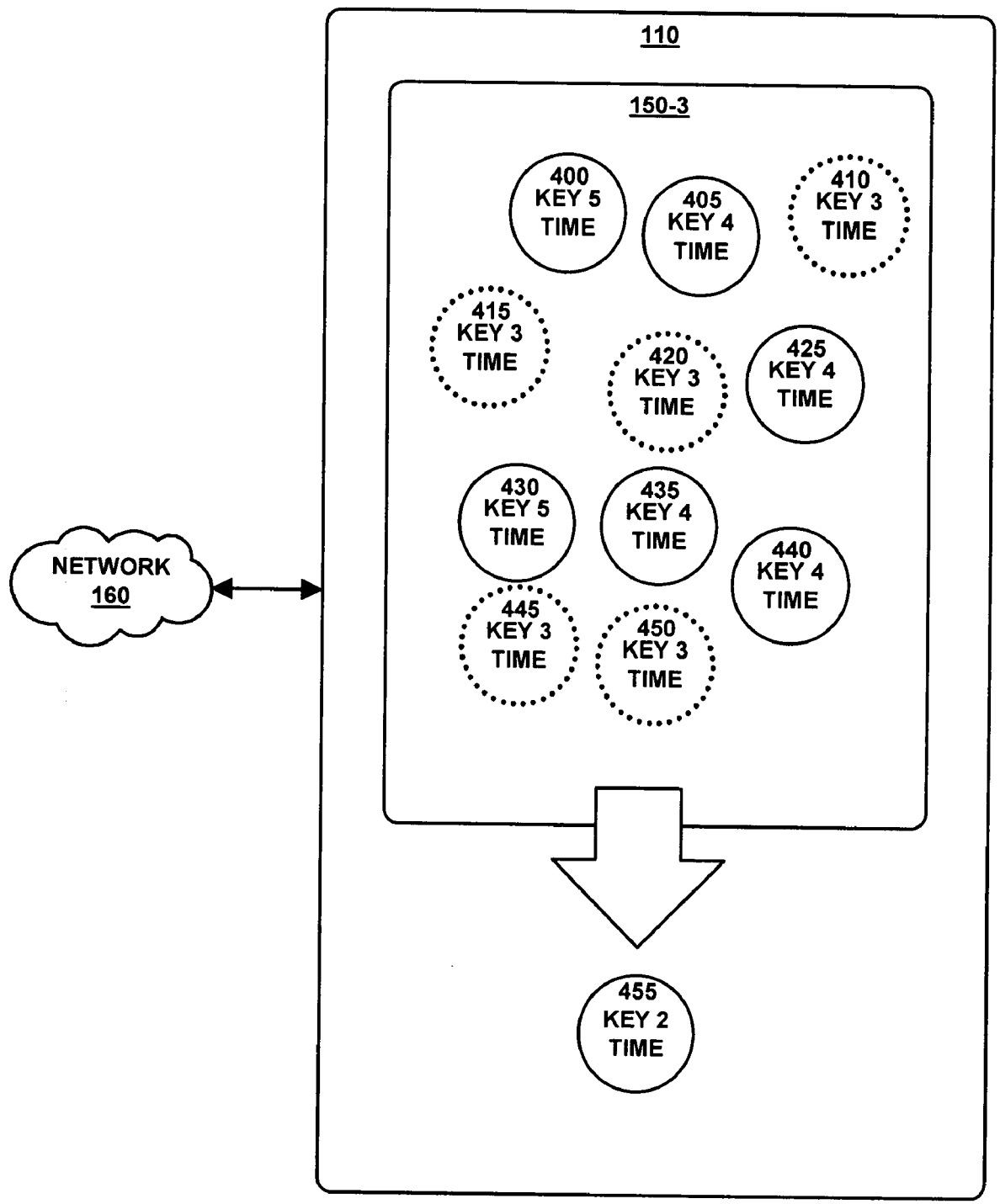
FIG. 8 shows a block diagram view according to one embodiment disclosed herein.

Jumping ahead to FIG. 8, the computer system 110 of FIG. 1 can be a server system that can receive tasks submitted by users over a network 160. The task scheduler 150 can operate on the server system 110 to provide fair scheduling of all tasks awaiting execution in a priority queue 150-3. According to the example illustrated in FIG. 8, there are 11 tasks 400-450 within the task pool of the priority queue 150-3. Each task shown in FIG. 8 (tasks 400-455) has a task-window key (labeled as "key") and a timestamp (labeled as "time"). For purposes of FIG. 8, the illustrated tasks 400-455 are not presented with unique timestamps. However, it is understood that each task in the priority queue 150-3 would have a timestamp representing when the task expects to be executed. FIG. 8 represents a moment in time within the task scheduler 150 where the lowest priority task in window 2 (task 455) has just been extracted from the queue 150-3 for execution. Thus, the minimum queue-window key is set at 2 and can be incremented from 2 to 3 in order to describe the "new" window in the queue 150-3 with the highest priority. For this instance, the minimum queue-window key is now 3 once task 455 is extracted for execution. Again, the queue-window key describes a window in the priority queue 150-3 and can is defined to increase in numerical order. Window 3 contains 5 tasks (410, 415, 420, 445, 450) that will be extracted from the priority queue 150-3 for execution according to earliest timestamp. By representing tasks 410, 415, 420, 445, 450 in FIG. 8 with dotted lines, it is understood that window 3 is a notional structure. Therefore, no structural implementation of window 3 is required within the priority queue 150-3. Instead, by identifying all tasks with a task-window key equal to 3, the priority queue 150-3 can interact and schedule the tasks accordingly.

Further details of configurations explained herein will now be provided with respect to flow charts of processing steps that show the high level operations disclosed herein to perform the task scheduler process 150-2, as well as graphical representations that illustrate implementations of the various configurations of the task scheduler process 150-2.

Figure 2:
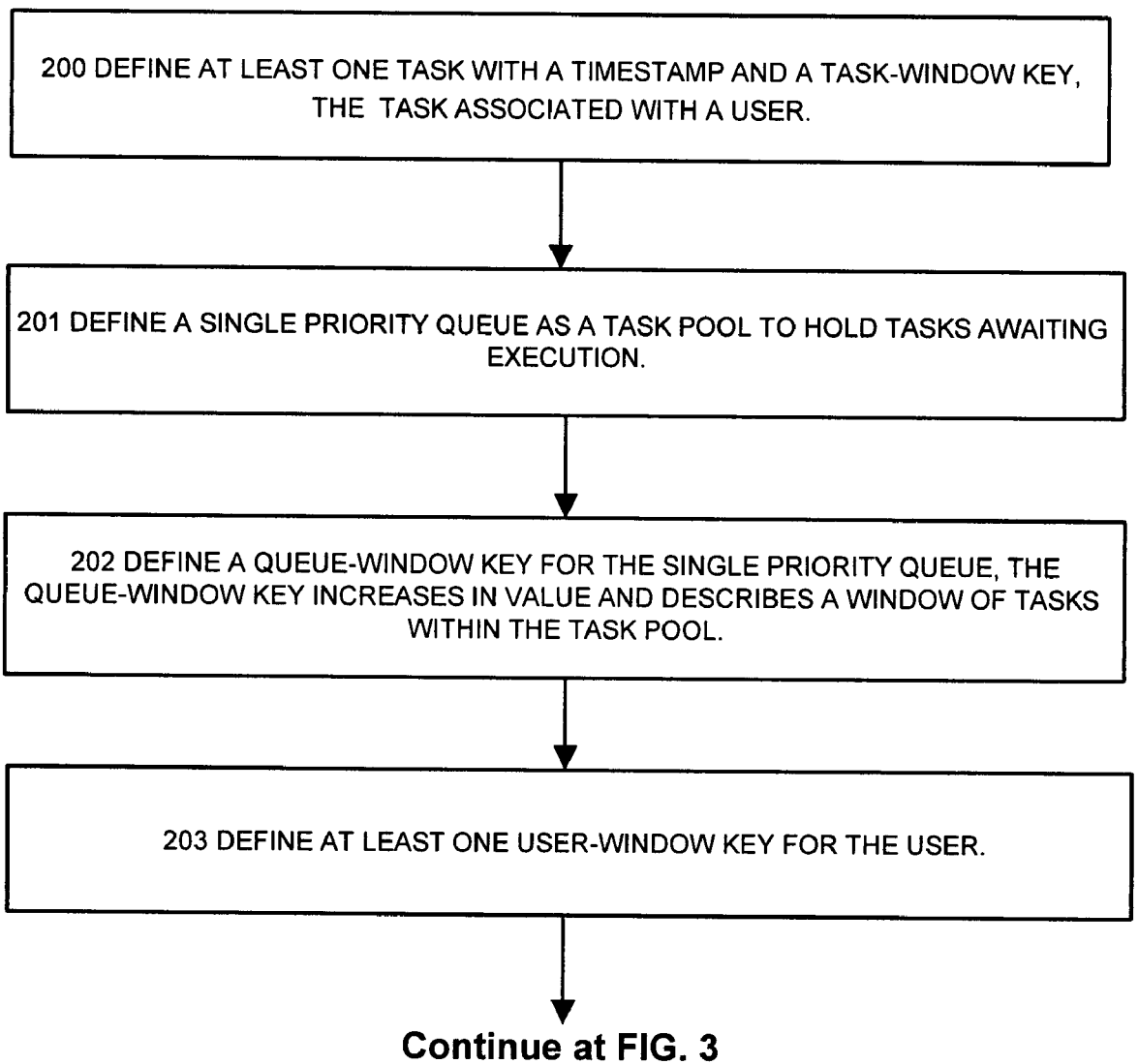
FIG. 2 is a flow chart of processing steps that show high-level processing operations performed by a task scheduler to define a single priority queue as a task pool to hold tasks awaiting execution.

Turning to FIG. 2, a flow chart of processing steps shows high-level processing operations performed by a task scheduler to define a single priority queue as a task pool to hold tasks awaiting execution. In step 200, the task scheduler defines at least one task with a timestamp and a task-window key, the task associated with a user. The timestamp can be part of the task itself and can also be appended to the data that comprises the task. In step 201, the task scheduler defines a single priority queue as a task pool to hold tasks awaiting execution.

In step 202, the task scheduler defines a queue-window key for the single priority queue 150-3, the queue-window key increases in value and describes a window of tasks within the task pool. Thus, a queue-window key of 18 describes a window at the 18th position in that it is preceded by 17 other notional windows in the priority queue. For this example, it is to be understood that the adjacent windows would be described when the queue-window key is set at 17 and 19. Thus, it is understood that there can be a plurality of queue-window key values describing a plurality of window "positions." Hence, window positions (or windows) 1-99 can all be described with a single "actual" queue-window key.

The queue-window key can be used to describe the current window with the highest priority in priority queue 150-3. To describe the highest priority window, the queue-window key can be set at a minimum value (the minimum queue-window key). If window 18 has the highest priority, then tasks from windows 1-17 have all been extracted from the priority queue and only tasks for window 18 and higher are currently awaiting extraction. Thus, in this instance, the minimum queue-window key is 18.

In step 203, the task scheduler defines at least one user-window key for the user. Many user-window keys can be related to the user 108. The task scheduler can use the value of the user-window key to describe a window to which a task may be queued. Also, each user-window key can be associated with a unique task priority type. The user-window key can be initialized at 0 and can be incremented and decremented independently of any other user-window keys.

Figure 3:
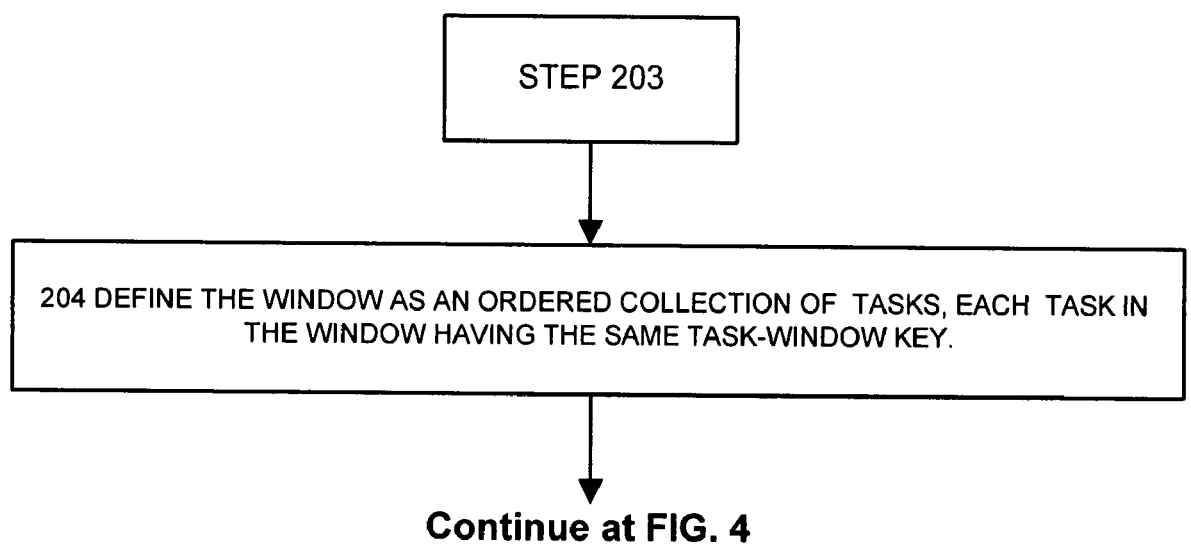
FIG. 3 is a flow chart of processing steps that show high-level processing operations performed by a task scheduler to define a window as an ordered collection of tasks.

FIG. 3 is a flow chart of processing step 204 that shows high-level processing operations performed by a task scheduler to define a window as an ordered collection of tasks. The priority queue 150-3 can have many windows, each being a unique subset of tasks in the priority queue 150-3. Any window in the priority queue 150-3 can be described by a key (queue-window key, user-window key, task-window key). A window can be notional and need not be identified by a memory address, so the priority queue 150-3 interacts with a window via the queue-window key and task-window keys. Each task in a window has the task-window key value. Thus, when the priority queue 150-3 is interacting with all tasks that have a task-window key set at 5, then the priority queue 150-3 is implicitly interacting with window 5.

Figure 4:
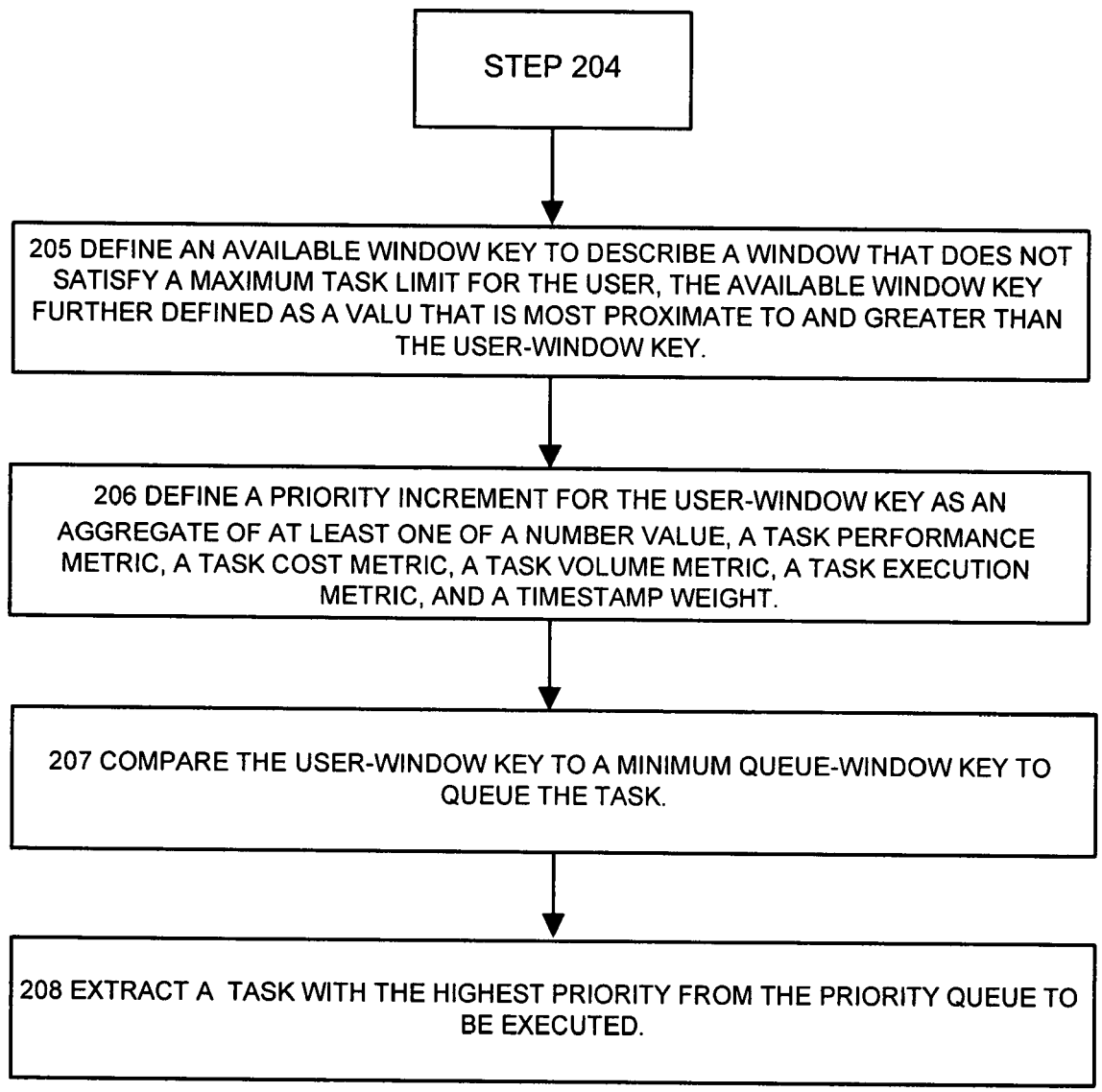
FIG. 4 is a flow chart of processing steps that show high-level processing operations performed by a task scheduler to defining an available window key and a priority window key.

FIG. 4 is a flow chart of processing steps that show high-level processing operations performed by a task scheduler to define an available window key. In step 205, the task scheduler 150 defines an available window key to describe a window that does not exceed (e.g. does not satisfy) a maximum task limit for the user, the available window key is further defined as a value that is most proximate to and greater than the user-window key. The maximum task limit allows the priority queue to assign a submitted task to a window that does not contain a predetermined maximum task capacity as to the submitting user. For instance, a window can have a maximum task limit of 1 task per user or 3 tasks per user. The maximum task limit can also be defined to allow each user a maximum of tasks of differing priority types to be contained within a window(s). For instance, 4 tasks per user (2 of high priority type, 1 of medium priority, and 1 of low priority). Further, when a window satisfies (e.g. exceeds) the maximum task limit for a user, then the next task submitted by that user must be queued at another window (as in the available window) that does not contain the maximum allowed tasks for that user.

Continuing with step 205, the task scheduler can assign the task to an adjacent window with a higher window value (described by a higher queue-window key). Therefore, if window "4" contains a maximum limit of tasks for the user 108, the priority queue will not queue the new task from user 108 to window "4," and can attempt to assign the new task to adjacent (e.g. most proximate and greater than) window "5." If window "5" contains a maximum limit as to the user 108, then window "5" satisfies the maximum limit and the priority queue can attempt to assign the new task to window "6." Thus, the task maximum limit can apply to each window in the priority queue.

Further, it is understood that the available window key will be greater than the user-window key associated with the user. However, the available window key will also be most proximate to the user-window key. Thus, the available window key will describe the closest window that does not exceed the maximum limit. The search for the available window will occur in the direction of increasing window positions.

In step 206, the task scheduler defines a priority increment for the user-window key as an aggregate of at least one of a number value, a task performance metric, a task cost metric, a task volume metric, a task execution metric or a timestamp weight. The priority increment can be a particular number value and can further be developed by considering metrics related to the processing of the tasks via the task scheduler. Such metrics can be statically defined and can be dynamic so that the task scheduler can provide "real-time" modification of one or more priority increments to provide fairness as the task scheduler interacts with tasks from users.

In step 207, the task scheduler compares the user-window key to a minimum queue-window key to queue the task. In step 208, the task scheduler extracts a task with the highest priority from the priority queue to be executed. Steps 207 and 208 will be given greater context in regards to FIGS. 5-6.

FIG. 5 is a flow chart of detailed processing steps that show high-level processing operations performed by a task scheduler to compare the user-window key to a minimum queue-window key to queue the task. Again, the minimum queue-window key is the current value of the queue window key which describes the window with the highest priority. In step 209, the task scheduler sets the task-window key of the task as equal to the user-window key when: the user-window key describes a window that does not satisfy (e.g. does not exceed) the maximum task limit for the user and the user-window key is greater than the minimum queue-window key and further sets the user-window key to an aggregate of the user-window key and the priority increment. Therefore, if a user-window key is 5 and the minimum queue-window key is 3, the task scheduler can further confirm that the window at position 5 does not exceed the maximum task limit for the user. Upon such confirmation, the task-window key can be set to 5 thereby assigning the task to window at position 5 in the priority queue. After the task is assigned, the user-window key can be incremented by aggregating the current value of the user-window key (5) and the priority increment. Thus, if the priority increment for this example is 7, then the user-window key can be set to 12.

In step 210, the task scheduler sets the task-window key of the task as equal to the available window key when: the user-window key describes a window that satisfies the maximum task limit for the user and the user-window key is greater than the minimum queue-window key and further sets the user-window key to an aggregate of the available window key and the priority increment. Therefore, if a user-window key is 10 and the minimum queue-window key is 5, the task scheduler can further confirm that the window at position 10 does satisfy the maximum task limit for the user. Thus, the nearest window to position 10 (which also must have a queue-window key that is greater than 10) that does not satisfy the maximum task limit is the available window. Upon identifying the available window as a window at position 15, the task-window key can be set to 15 thereby assigning the task to window at position 15 in the priority queue. After the task is assigned, the user-window key can be incremented by aggregating the available window key (15) and the priority increment. Thus, if the priority increment for this example is 2, then the user-window key can be set to 17.

FIG. 6 is a flow chart of processing steps that show high-level processing operations performed by a task scheduler to compare the user-window key to a minimum queue-window key to queue the task. In step 211, the task scheduler sets the task-window key of the task as equal to the minimum queue-window key when the user-window key is less than the minimum queue-window key and further sets the user-window key to an aggregate of the minimum queue-window key and the priority increment. Therefore, if a user-window key is 0 and the minimum queue-window key is 3, the task-window key can be set to 3 thereby assigning the task to the window at the minimum position 3 in the priority queue. After the task is assigned, the user-window key can be incremented by aggregating the current value of the minimum queue-window key (3) and the priority increment. Thus, if the priority increment for this example is 7, then the user-window key can be set to 10.

Figure 7:
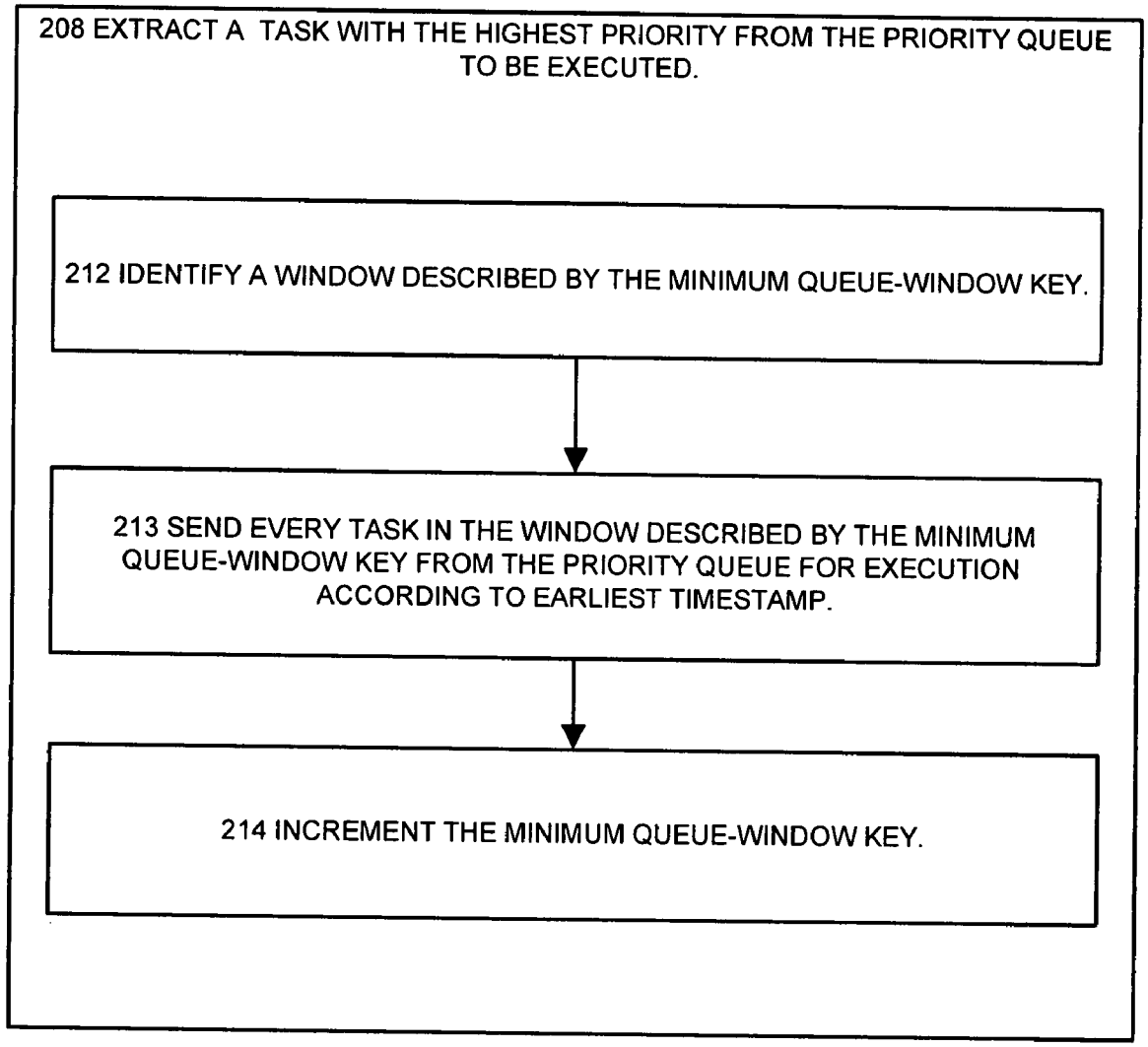
FIG. 7 is a flow chart of processing steps that show high-level processing operations performed by a task scheduler to extract a task with the highest priority from the priority queue to be executed.

FIG. 7 is a flow chart of processing steps that show high-level processing operations performed by a task scheduler to extract a task with the highest priority from the priority queue to be executed. In step 212, the task scheduler identifies a window described by the minimum queue-window key. When the minimum queue-window key is 6, windows at positions 1-5 have already submitted all tasks and no longer exist in the priority queue. Thus, the minimum position in the priority queue is 6 thereby giving window 6 the highest priority above all other windows in the priority queue. In step 213, the task scheduler sends every task in the window described by the minimum queue-window from the priority queue for execution according to earliest timestamp. Continuing with the example of window 6, all tasks with a task-window key of 6 have a high priority due to the fact that they belong to the minimum window. The order in which the tasks can be submitted for execution is determined by the timestamp for each task. The earlier the timestamp, the sooner the task will be sent for execution from window 6. The task with the latest timestamp will be the last task extracted from window 6. The task with the earliest timestamp will be the first task extracted from window 6. In step 214, the task scheduler increments the minimum queue-window key. Again with the example of window 6, when all window 6 tasks have been extracted there is no longer a need for window 6 to maintain a high priority. However, the tasks at the nearest adjacent window, window 7, need to be executed. Thus, the minimum queue-window key can be incremented from 6 to 7 in order to describe the next adjacent window (7) that holds the next collection of tasks to be extracted.

Other embodiments of the task scheduler disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other task scheduler embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer implemented method comprising:
defining at least one task with a task window key, the at least one task associated with a user;
defining a single priority queue as a task pool to hold at least one task awaiting execution;
defining a queue-window key for the priority queue to describe a window of tasks within the task pool;
defining the window as a collection of tasks within the task pool of the priority queue, each task in the window having a same task-window key;
defining at least one user-window key for the user;
comparing the user-window key to a minimum queue-window key to queue a task associated with the user, the minimum queue-window key representing a current value of the queue-window key; and
extracting at least one task with a highest priority from the priority queue to be executed, wherein extracting comprises
identifying the window described by the minimum queue-window key,
sending every task in the window described by the minimum queue-window key from the priority queue for execution, and
incrementing the minimum queue-window key.

2. The computer implemented method as in claim 1 further comprising defining a timestamp for a task.

3. The computer implemented method as in claim 1 further comprising:
defining an available window key to describe a window that does not satisfy a maximum task limit for the user, the available window key further defined as a value that is most proximate to and greater than the user-window key.

4. The computer implemented method as in claim 1 further comprising:
defining a priority increment for the user-window key as an aggregate of at least one of a number value, a task performance metric, a task cost metric, a task volume metric, a task execution metric or a timestamp weight.

5. The computer implemented method as in claim 1, wherein comparing the user-window key to a minimum queue-window key to queue the task comprises:
setting the task-window key of the task as equal to the user-window key when: the user-window key describes a window that does not satisfy the maximum task limit for the user and the user-window key is greater than the minimum queue-window key and further setting the user-window key to an aggregate of the user-window key and the priority increment; and setting the task-window key of the task as equal to the available window key when: the user-window key describes a window that satisfies the maximum task limit for the user and the user-window key is greater than the minimum queue-window key and further setting the user-window key to an aggregate of the available window key and the priority increment.

6. The computer implemented method as in claim 1, wherein comparing the user-window key to a minimum queue-window key to queue the task comprises:

setting the task-window key of the task as equal to the minimum queue-window key when the user-window key is less than the minimum queue-window key and further setting the user-window key to an aggregate of the minimum queue-window key and the priority increment.

7. A non-transitory computer readable medium comprising executable instructions stored thereon operable on a computerized device to perform processing comprising:

defining at least one task with a task window key, the at least one task associated with a user;

defining a single priority queue as a task pool to hold at least one task awaiting execution;

defining a queue-window key for the priority queue to describe a window of tasks within the task pool;

defining the window as a collection of tasks within the task pool of the priority queue, each task in the window having a same task-window key;

defining at least one user-window key for the user;

comparing the user-window key to a minimum queue-window key to queue a task associated with the user, the minimum queue-window key representing a current value of the queue-window key; and extracting at least one task with a highest priority from the priority queue to be executed, wherein extracting comprises identifying the window described by the minimum queue-window key, sending every task in the window described by the minimum queue-window key from the priority queue for execution, and incrementing the minimum queue-window key.

8. The computer readable medium as in claim 7 further comprising instructions to perform processing comprising defining a timestamp for a task.

9. The computer readable medium as in claim 7 further comprising instructions to perform processing comprising:

defining an available window key to describe a window that does not satisfy a maximum task limit for the user, the available window key further defined as a value that is most proximate to and greater than the user-window key.

10. The computer readable medium as in claim 7 further comprising instructions to perform processing comprising:

defining a priority increment for the user-window key as an aggregate of at least one of a number value, a task performance metric, a task cost metric, a task volume metric, a task execution metric or a timestamp weight.

11. The computer readable medium as in claim 7, wherein the instructions for comparing the user-window key to a minimum queue-window key to queue the task comprise instructions for:

setting the task-window key of the task as equal to the user-window key when: the user-window key describes a window that does not satisfy the maximum task limit for the user and the user-window key is greater than the minimum queue-window key and further setting the user-window key to an aggregate of the user-window key and the priority increment; and setting the task-window key of the task as equal to the available window key when: the user-window key describes a window that satisfies the maximum task limit for the user and the user-window key is greater than the minimum queue-window key and further setting the user-window key to an aggregate of the available window key and the priority increment.

12. The computer readable medium as in claim 7, wherein the instructions for comparing the user-window key to a minimum queue-window key to queue to task comprise instructions for:

setting the task-window key of the task as equal to the minimum queue-window key when the user-window key is less than the minimum queue-window key and further setting the user-window key to an aggregate of the minimum queue-window key and the priority increment.

* * * * *